(12) United States Patent
Pison

(10) Patent No.: US 8,625,437 B2
(45) Date of Patent: Jan. 7, 2014

(54) INFRASTRUCTURE FOR PROFESSIONAL RADIOCOMMUNICATION NETWORK

(75) Inventor: Laurent Pison, Jouars-Ponchartrain (FR)

(73) Assignee: Cassidian SAS, Elancourt (FR)

( * ) Notice: Subject to any disclaimer, the term of this patent is extended or adjusted under 35 U.S.C. 154(b) by 266 days.

(21) Appl. No.: 13/120,578

(22) PCT Filed: Sep. 24, 2010

(86) PCT No.: PCT/FR2010/052016
§ 371 (c)(1),
(2), (4) Date: Mar. 23, 2011

(87) PCT Pub. No.: WO2012/038611
PCT Pub. Date: Mar. 29, 2012

(65) Prior Publication Data
US 2012/0076000 A1    Mar. 29, 2012

(51) Int. Cl.
*H04W 24/00* (2009.01)
(52) U.S. Cl.
USPC .......................................... 370/241; 370/329
(58) Field of Classification Search
USPC ................. 370/241, 328, 331, 338, 465, 329
See application file for complete search history.

(56) References Cited

U.S. PATENT DOCUMENTS

| | | | |
|---|---|---|---|
| 6,199,161 B1* | 3/2001 | Ahvenainen | 713/155 |
| 2006/0209747 A1* | 9/2006 | Smago et al. | 370/328 |
| 2010/0035603 A1* | 2/2010 | Saijonmaa et al. | 455/426.1 |
| 2011/0294534 A1* | 12/2011 | Gunder | 455/524 |
| 2012/0071084 A1* | 3/2012 | Gholmieh et al. | 455/3.01 |

FOREIGN PATENT DOCUMENTS

WO    WO 2009/089908    7/2009

OTHER PUBLICATIONS

International Search Report dated Jun. 29, 2011 for PCT/FR2010/052016.
Durantini et al.; "Integration of Broadband Wireless Technologies and PMR Systems for Professional Communications", Networking and Services, 2008, ICNS 2008, Fourth International Conference on Networking and Services, IEEE, Piscataway, NJ, USA, Mar. 16, 2008, pp. 84-89.
Aiache et al.; "Increasing Public Safety Communications Interoperability: The Chorist Broadband and Wideband Rapidly Deployable Systems", Communications Workshop, 2009, ICC Conference on, IEEE, Piscataway, NJ, USA, Jun. 14, 2009, pp. 1-6.

* cited by examiner

*Primary Examiner* — Brian D Nguyen
(74) *Attorney, Agent, or Firm* — Pillsbury Winthrop Shaw Pittman LLP

(57) ABSTRACT

A professional radiocommunication network infrastructure operating in packet mode includes a site controller with a specified geographic area including a base station capable of ensuring radio transmission and reception with a user terminal found in a cell attached to the base station; a centralized supervision device configured to detect if the infrastructure is in a nominal or isolated operating state; and a centralized device for associating with a centralized packet network to establish access between at least one centralized application and a first application during operation of the infrastructure detected according to a nominal state.

14 Claims, 2 Drawing Sheets

INFRASTRUCTURE FOR PROFESSIONAL RADIOCOMMUNICATION NETWORK

CROSS REFERENCE TO RELATED APPLICATIONS

This application is the U.S. National Stage of PCT/FR2010/052016, filed Sep. 24, 2010, the content of which is incorporated herein by reference in its entirety.

The present invention relates to an infrastructure for a PMR professional radiocommunication network.

PMR (Professional Mobile Radiocommunication) professional communication networks of the TETRA (Trans European Trunked Radio) or TETRAPOL type defined by the TETRAPOL industrial forums (http://www.tetrapol.com) or else of the P25 type defined by the Telecommunications Industry Association (TIA) for the Association of Public-Safety Communications Officers (APCO) are independent mobile communication networks dedicated for the use of companies or administrations, particularly for ensuring public safety, industrial safety or for use in transport activities. PMR networks are largely utilized by public safety services (police forces and national police, for example) and emergency services, and also by many other user categories (public transport, airports, etc.). These are private networks that present a high level of security. Current PMR networks, based on the technologies cited above, are known as narrowband networks, characterized by a channel width on the order of about ten kilohertz (kHz).

The structure of professional radiocommunication networks is standardized. The latter are based on a mesh architecture that is common to all types of communication networks. Mobile terminals are connected to the network via wireless access points, called base stations.

As represented in FIG. 1, the architecture of a PMR network 1 of the narrowband type usually comprises:
- a site controller 2 that comprises:
  - a radio relay 4 integrating a transmitter operating in radio transmission/reception and two or three layers:
    - a physical layer PHY;
    - a MAC (Media Access Control) type layer;
    - possibly an LLC (Logical Link Control) type layer;
  - onboard applications 3 for a minimal operation in which the terminals may have access via the radio relay 4;
- means 5 enabling terminals 7 (only one terminal 7 was represented here) access to a series of centralized communication applications 6 (or centralized services 6) of a higher level than onboard applications 3. In particular, in the nominal operating state, applications 6 ensure the routing and switching of communication data between different terminals 7.

The site controller 2 aims to manage a predefined geographic site or area (known as a resilient area) that one wishes to resiliently protect (resilience is the capacity of the site to continue to operate in case of breakdown, for example of the central controller, the transport network or most of the entities (redundant) of the site). This area is composed of at least one radio relay and at least one cell.

The radio relay 4 and access means 5 enable the terminals to have access to centralized communication applications 6 via a channel 8 allocated dynamically called trunked.

Therefore, in nominal operation, mobile terminal 7 has access to centralized applications 6 that enable it to communicate with terminals attached to a group communication.

However, if the communication channel 8 established between mobile terminal 7 and means 5 is interrupted (typically a loss of connections in difficult places to reach or a network loss), the PMR systems have a critical mission requirement. In this case, the PMR network must enable passage from a nominal operating state (channel 8) to an isolated operating state (channel 9). The controller 2 will detect the isolated operating state and must ensure a minimal operation of group communications from the site managed by controller 2. Thus, in the case of an isolated operating state, terminals belonging to the same site have access via relay 4 to a series of basic applications 3; This series of basic operation applications 3 obviously comprises fewer applications than the series of centralized applications 6 but must ensure vocal communications of groups of site terminals at a minimum.

The evolution of telecommunications networks and the rise of high bandwidth encourage PMR network users to demand applications that are still more advanced, necessitating a higher bandwidth. Consequently, it is important to be able to make PMR networks evolve to the highest broadband widths corresponding to a long range mobile radiocommunication standard of the LTE (Long Term Evolution) or WiMAX (Worldwide Interoperability for Microwave Access) type. These technologies enable very high speed communications such as LTE or WIMAX technologies, unlike 2G or 3G technologies where one distinguishes the circuit switched domains and the packet switched domains, now only having a single packet domain; thus, all services will be offered on IP (Internet Protocol), including those that were previously offered by the circuit domain such as voice, videotelephony, etc. However, it should be noted that requirements peculiar to public networks utilizing very high bandwidth wireless technologies such as LTE or WIMAX are very different from those of PMR networks. Thus, the critical mission and resilience (availability of the network even in case of loss of access to the site controller) concepts peculiar to PMR networks are not taken into consideration in LTE or WIMAX type very high speed technologies that further aim to affect as many users as possible with a high density of radio sites.

Some technologies, such as TETRA, have evolved to TEDS (for TETRA Enhanced Data System) higher speeds in broadband with speeds on the order of some hundreds of kbits/s. However, this significant speed increase compared to narrowband networks only offers some new applications of the e-mail, Internet/Intranet access and low resolution video type. It follows that the progress made by broadband technologies is insufficient and unsuitable for the evolution of current applications and to the increasing needs of different users (typically, mobile video).

In this context, the invention aims to propose a professional radiocommunication network infrastructure operating in packet mode and enabling data transfer at very high speed while taking the characteristics of PMR networks into account.

For this purpose, the invention applies to a professional radiocommunication network infrastructure operating in packet mode, said infrastructure comprising a site controller with a specified geographic area comprising at least one base station capable of ensuring radio transmission and reception with at least one user terminal located in at least one cell attached to said base station, said infrastructure being characterized in that the infrastructure also comprises centralized management means comprising:
- at least one centralized application able to communicate with a first application in said terminal;
- centralized supervision means able to detect if said infrastructure is in a nominal or isolated operating state; and
- centralized means for associating with a centralized packet network to establish access between said at least one centralized application and said first application during operation of said infrastructure detected according to a nominal state;

said site controller comprising:

at least one local communication application able to communicate with a second application in said user terminal;

local supervision means able to detect if said infrastructure is in a nominal or isolated operating state;

user terminal authentication and control means able to authenticate the user terminals belonging to said professional network;

a distribution gateway ensuring radio reception and transmission 5 with said at least one base station; and local means for attachment to a local packet network to establish access between said local communication application and said second application during operation of said infrastructure detected according to an isolated state.

When said infrastructure is found in a nominal operating state, the following is allocated to each user terminal situated in the specified geographic area and attached to said site controller:

a centralized access channel connecting said distribution gateway to said centralized application via said first attachment means, said user terminal being able to be attached to said first attachment means via said distribution gateway by means of a centralized data channel that is dynamically allocated to it, said centralized data channel passing through said centralized access channel;

a local access channel connecting said distribution gateway to said local communication application via said second attachment means, said user terminal being able to be attached to said second attachment means via said distribution gateway by means of a local data channel that is dynamically allocated to it, said local data channel passing through said local access channel.

When said infrastructure is in a local operating state in the course of which access to said centralized management means is interrupted, only said local access channel is allocated to each user terminal situated in the specified geographic area and attached to said site controller, said user terminal being able to be attached with said second attachment means via said distribution gateway by means of said local data channel that is dynamically allocated to it and passing through said local access channel.

Thanks to the invention, the infrastructure according to the invention enables a PMR network user to have the view and impression of a global standard network. According to the nominal operating state, all standard services (centralized applications and possibly local applications) are available. According to the isolated operating state, all local services (local applications) are accessible: Thus the user has the impression of having access to a network utilizing very high bandwidth wireless technologies such as the full LTE or WIMAX standard technologies of the size of a site.

To do this, one puts a network anchoring point down at the site level and makes the requirements (particularly resilience requirements in the context of a critical mission) of a PMR professional radiocommunication network infrastructure compatible with a broadband network operating exclusively in LTE or WIMAX type packet mode; It is possible to transfer very high speed data so as to be able to propose high-level functionalities to users, for example video transfers in streaming mode able to be used for police services. Radiocommunication networks such as LTE or WIMAX operate in any IP mode; Thus, unlike 2G or 3G networks where one distinguished the circuit switched domains and the packet switched domains, all services here are offered on IP, including those that were offered previously by the circuit domain such as voice or videotelephony.

The infrastructure according to the invention is adapted to PMR network users since it meets the critical mission requirements encountered, for example during a loss of access to the centralized management means in locations difficult to reach. In fact, even if the centralized data channel is interrupted, the user terminals located in the specified geographic area (corresponding to the PMR network resilience area) covered by the site controller may communicate between each other via the local data channel by passing through the radio gateway and the second means of attachment to the packet network. Thus, this advantageous modality ensures communication between different user terminals of the same geographic area specified for managing a crisis situation.

In a nominal operating state, two access channels are allocated to a terminal: a first access channel for the centralized application of the centralized management means and a second access channel for the local application of the site controller; The first channel may be utilized alone but one may also contemplate using the two access channels in a nominal operating state, the two access channels anyway being allocated to the terminal in the nominal operating state.

It should be noted that several centralized application access channels may be utilized simultaneously.

The infrastructure according to the invention may also present one or more of the characteristics below, considered individually or according to all technically possible combinations:

said centralized management means comprise a database comprising data relative to the right of access of user terminals to said professional radiocommunication network;

in said nominal state, each communicating user terminal situated in the specified geographic area and attached to said site controller is simultaneously connected to said centralized application via said centralized data channel and to said local communication application via said local data channel such that said user terminal only retains said local data channel when said infrastructure switches in its isolated state;

in said nominal state, each communicating user terminal situated in the specified geographic area and attached to said site controller is only connected to said centralized application via said centralized data channel, said local data channel being effective when said infrastructure switches over in its isolated state;

said infrastructure is in conformance with a large capacity or high speed mobile radiocommunication standard in any IP mode of the LTE or WIMAX type;

said infrastructure is in conformance with an LTE mobile radiocommunication standard, said centralized attachment means being formed by a PDN-GW "Packet Data Network Gateway" entity, said database being formed by an HSS "Home Subscriber Server" entity, said centralized supervision means being formed by a network supervision entity, said local association means being formed by a second PDN-GW "Packet Data Network Gateway" entity, said authentication and control means of said user terminals being carried out by an MME "Mobility Management Entity,"

said distribution gateway being formed by an S-GW "Serving Gateway" entity, said local supervision means being formed by a site supervision entity, said at least one base station being formed by an eNodeB "evolved NodeB" entity;

said user terminal authentication and control means are able to select a distribution gateway and centralized means for attachment to a centralized packet network that will be used to implement said centralized data channel passing through said centralized access channel;

said user terminal authentication and control means are capable of selecting a distribution gateway and local means for attachment to a local packet network that will be used to implement said local data channel passing through said local access channel;

said infrastructure comprises at least two site controllers, each able to manage a specified geographic area, said at least two site controllers being able to communicate with each other and each of said site controllers being able to communicate with said centralized management means;

at least one of said packet networks is an IP network;

said authentication and control means comprise means for dynamically allocating said centralized data channel and said local data channel.

Another object of the invention is a method for user terminal access to at least one local communication application and at least one centralized application within a professional radiocommunication network infrastructure, said infrastructure comprising:

centralized management means comprising:
at least one centralized application able to communicate with a first application in said terminal, centralized supervision means able to detect if said infrastructure is in a nominal or isolated operating state, and centralized means for attachment to a centralized packet network to establish access between said at least one centralized application and said first application during operation of said infrastructure detected according to a nominal state;

a database comprising data relative to the right of access of user terminals to said professional radiocommunication network, a site controller for a specified geographic area comprising:
at least one base station able to ensure radio transmission and reception with user terminals found in at least one cell attached to said base station;

at least one local communication application capable of communicating with a second application in said user terminal;

user terminal authentication and control means capable of authenticating the user terminals belonging to said professional network;

a distribution gateway ensuring radio reception and transmission with said at least one base station; and local means for attachment to a local packet network;

said method for access being characterized in that when said infrastructure is found in a nominal operating state, said method comprises the following steps:

authenticating said user terminal via said authentication and control means upon arrival of said user terminal in said cell, verifying the rights of access of said user terminal to said professional radiocommunication network via said authentication and control means communicating with said database, allocating a centralized access channel connecting said distribution gateway to said centralized application via said first centralized attachment means; the allocation of said centralized access channel allowing a centralized data channel passing through said centralized access channel performing the attachment of said user terminal to said centralized association means via said distribution gateway to be dynamically allocated to said user terminal, allocating a local access channel connecting said distribution gateway to said local communication application via said second local attachment means; the allocation of said local access channel allowing a local data channel passing through said local access channel performing the attachment of said user terminal to said local attachment means via said distribution gateway to be dynamically allocated to said user terminal, Said centralized and local access channels being accessible in a first operating state of the infrastructure called the nominal state and only said local access channel being accessible in a second operating state of the infrastructure called the isolated state such that said user terminal is able to be attached only to said local association means via said distribution gateway by means of said local data channel when access to said centralized management means is interrupted.

The method according to the invention may also present one or more of the characteristics below, considered individually or according to all technically possible combinations:

said method comprises a step of detecting by the local supervision means belonging to said site controller a loss of access for user terminals to said centralized management means, said local supervision means forcing the passing from the nominal state to the isolated state in said site controller;

said method comprises a step of detecting by said local supervision means a recovery of access of user terminals to said centralized management means, said local supervision means forcing the passing from the isolated state to the nominal state in said site controller;

For the rest of the description, active mode (or communication mode) is understood to refer to a mode in which a mobile user terminal exchanges communication data with the network via a data channel utilizing an access channel.

When said user terminal is in active mode, the following are allocated to the user terminal:
said centralized access channel,
said local access channel, and
said centralized data channel and/or said local access channel.

For the rest of the description, idle mode is understood to refer to a mode in which a mobile user terminal does not exchange data with the network but has an access channel to the site controller allowing it to have a local data channel allocated to it when it passes into active mode. Also, it has an access channel to said centralized management means allowing it to have a centralized data channel allocated to it when it passes into active mode.

Other characteristics and advantages of the professional radiocommunication infrastructure and method according to the invention will clearly emerge from the description given below, for indicative and in no way limiting purposes, with reference to the attached figures among which:

For reasons of clarity, only the elements essential for understanding the invention have been represented, without respecting the scale and schematic manner.

Figure 1:
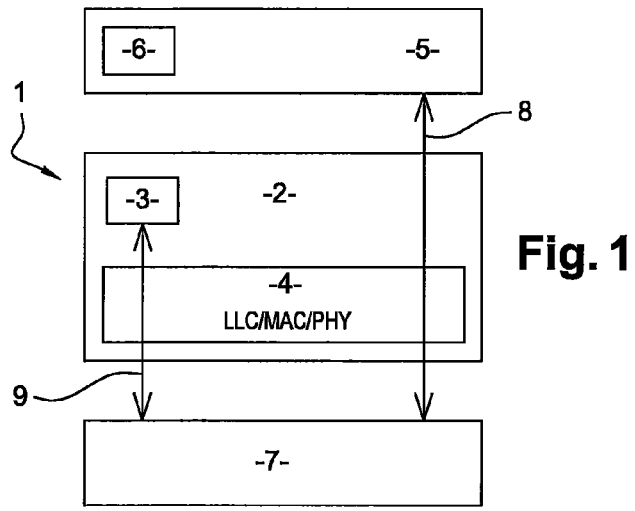
FIG. 1 represents an embodiment of a PMR network according to the prior art.

FIG. 1 was already described to illustrate a PMR network described in the prior art.

Figure 2:
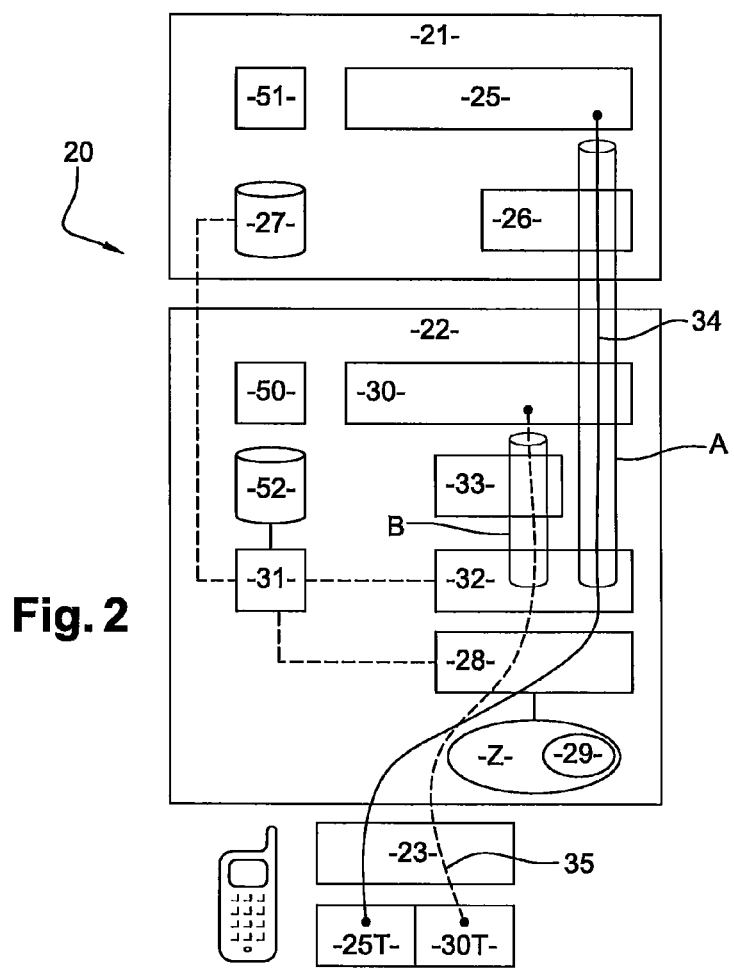
FIG. 2 illustrates an embodiment of a professional radiocommunication infrastructure in conformance with the invention.

FIG. 2 represents a PMR professional radiocommunication infrastructure 20 according to the invention. For purely illustrative purposes, the means described in this embodiment refer to the terminology utilized in an LTE type technology. It is understood that this infrastructure is in no way limited to such a radiocommunication standard and may apply to any type of broadband radiocommunication in packet mode, for example WIMAX technology. Infrastructure 20 comprises:
- centralized management means 21, and
- a site controller 22 by site Z.

A site Z may be defined as a specified geographic area that one wishes to protect resiliently. This area is composed of at least one cell 29 and may comprise a plurality of cells (here area Z is composed of a single cell merged with area Z).

Centralized management means 21 comprising:
- a plurality of centralized applications 25 (for example, vocal communication or video transmission applications);
- centralized means 26 for attachment to a centralized packet network (typically an IP network) such as a PDN-GW "Packet Data Network Gateway" entity in LTE technology; the PDN-GW entity forms a first anchoring point to the IP "Internet Protocol" network; it should be noted that it is possible to have several PDN-GW 26 depending on the type of data to transmit or depending on the services one wishes to access;
- a static database 27 comprising data related to the right of access of user terminals to a professional radiocommunication network such as an HSS "Home Subscriber Server" in LTE technology; and
- centralized supervision means 51 capable of reliably detecting a loss of user terminal access to site controller 22 described below; The centralized supervision means 51 are, for example, formed by a system supervision entity.

The site controller 22 comprises:
- a base station 28 capable of ensuring radio transmission and reception with user terminals 23 of the PMR network found in a cell 29 attached to the base station 28 and found in area Z; the base station is for example an eNodeB entity in LTE technology;
- at least one application, known as the local communication application 30;
- authentication and control means 31 able to authenticate the user terminals belonging to the professional network 20 and able to manage data channels 34 and 35 as well as access channels A and B, which we will return to in the rest of the description; the authentication and control means 31 are, for example, an MME "Mobility Management Entity" in LTE technology;
- a distribution gateway 32 ensuring radio reception and transmission with the base station 28; the distribution gateway 32 is for example an S-GW "Serving Gateway" entity in LTE technology;
- local means 33 for attachment to a local packet network (typically an IP network) such as a PDN-GW "Packet Data Network Gateway" entity in LTE technology forming a second anchoring point to the IP network;
- local supervision means 50 reliably detecting a loss of user terminal access to the centralized management means 21; the local supervision means 50 are, for example, a site supervision entity;
- an optional local database 52.

It should be noted that each terminal 23 comprises:
- a first application 25T able to communicate with the centralized applications 25 of the centralized management means 21, and
- a second application 30T able to communicate with the local communication application 30 of the site controller 22.

Applications 25T and 30T respectively communicate with applications 25 and 30, their connection being made by means of access channels A and B.

It should be noted that the centralized management means 21 generally cover several sites (cf. FIG. 3 later) and are thus attached to several site controllers 22. It will be observed that, according to the invention, infrastructure 20 comprises:
- at least one network anchoring point PDN-GW 26 (the centralized attachment means 26) at a high centralized level (i.e. capable of covering several sites) and;
- at least one gateway S-GW 32 and at least a second network anchoring point PDN-GW 33 (local joining means 33) situated at site level.

It should be noted that the authentication and control means MME 31 are not only responsible for authenticating user terminals from terminal data collected from database HSS 27 but these means MME 31 also enable a distribution gateway S-GW 32 (in the case of a plurality of distribution gateways S-GW 32) and centralized means PDN-GW 26 for attachment to a network IP (in case of a plurality of centralized attachment means PDN-GW 26) to be selected in order to establish a centralized access channel A dedicated to a terminal 23 at the time of its arrival in area Z and its access to the centralized management means 21.

The MME 31 means also enable a local access channel B passing through the distribution gateway 32 and local means 33 for associating with the IP network to be established, this access channel B being dedicated to terminal 23 upon its arrival in area Z and its access to the site controller 22.

In other words, as soon as terminal 23 accesses the centralized management means 21 and the site controller 22 (as the terminal is in idle mode or in active mode (communication), access channels A and B are established.

During a communication request by a user terminal 23 situated in the specified geographic area Z, the centralized 51 and local 50 supervision means ensure that the transmission state is possible to and from the site. If these transmissions are possible, the infrastructure 20 is then in an operating state known as nominal operation.

In this nominal operating state of the infrastructure, applications 25T and 30T of terminal 23 may respectively access centralized 25 and local 30 applications:
- either alternately: in this case, terminal 23 accesses in nominal mode the centralized applications 25 that in this case are communication applications enabling in nominal operation routing and switching of communication data between different terminals, in particular, to be ensured, and retain the possibility of accessing via local access channel B the local communication application 30 that in an isolated operating state of the infrastructure enables the routing and switching of communication data between different terminals present in geographic area Z to be ensured;

or simultaneously: in this case, terminal 23 accesses both the centralized applications 25 and the local communication application 30, the centralized applications 25 being applications known as secondary; In this case, only the local communication application 30 ensures the routing and switching of communication data between the different PMR network terminals in nominal operation and different terminals of the geographic area Z in isolated (or local) operation.

In case of utilization of a centralized application 25 and/or a local communication application 30 by terminal 23, the MME means 31 order the establishment of centralized 34 and local 35 data communication channels dynamically allocated to terminal 23. It should be noted that the centralized data channel 34 passes through centralized access channel A and local data channel 35 passes through local access channel B, access channels A and B still being pre-established.

When user terminal 23 accesses centralized applications 25 in simultaneous mode and local applications 30 in nominal operation, terminal 23 is attached:

to centralized attachment means PDN-GW 26 via the dynamically allocated centralized data channel 34 passing through centralized access channel A, and to local attachment means PDN-GW 33 via the dynamically allocated local data channel 35 passing through local access channel B.

In nominal operation, terminal 23 in idle mode is attached to the network via established access channels A and B. When terminal 23 passes in "communication" mode, the data communication channel 34 passing through access channel A and local data channel 35 passing through local access channel B are established. By passing from idle mode to "communication" mode, the communication data are transmitted in channels 34 and 35 via access channels A and B.

When the user terminal 23 accesses in alternate mode centralized 25 applications and local 30 applications, terminal 23 is attached to the centralized attachment means PDN-GW 26 via the dynamically allocated centralized data channel 34 passing through centralized access channel A. In nominal operation, local access channel B remains pre-allocated such that during a switch in local operation of the infrastructure, the user terminal 23 is attached to the local attachment means PDN-GW 33 via the dynamically allocated local data channel 35 passing through local access channel B.

The presence of the pre-allocated access channel B will facilitate switching of the infrastructure 20 from the nominal state to a second operating state, known as the isolated state.

The infrastructure 20 may thus present another operating state known as isolated operation ensuring the critical mission requirement peculiar to PMR infrastructures. This isolated operating state is present when the transfer of data via the centralized data channel 34 is interrupted (typically a loss of network access via the first network anchoring point PDN-GW 26 or a cut in the centralized channel 34).

The passage from a nominal operating state to an isolated operating state is detected by local supervision means 50 of the site that are able to detect a loss of access of terminal 23 to the centralized management means 21. In this scenario, the local supervision means 50 inform the controller 22 of the passage according to the isolated operating state and force the local communication application 30, the authentication and control means 31, the distribution gateway S-GW 32 and the local attachment means PDN-GW 33 to operate according to the isolated operating state; Communications to the outside of the site are prohibited as long as the local supervision means 50 do not indicate the reestablishment of the nominal state.

It should be noted that the centralized supervision means 51 are also able to detect a loss of access of terminal 23 to the management controller 22; Doing so, the centralized supervision means 51 inform the centralized applications 25 such that access of terminal 23 to the centralized applications 25 is interrupted. In general, information is also transmitted by the centralized applications 25 to the network operator to inform it of the loss of access.

In the isolated operating state, the access channel A may no longer be utilized. Two situations are then possible during passage from nominal operation to isolated operation:

either access to applications 25 and 30 is in alternate mode; in this case, in isolated operation, the local communication application 30 becomes the main communication application that ensures the routing and switching of communication data between the different terminals present in the site and "takes" the hand such that all the terminals 23 attached to the site have access to local communication application 30. In this mode, local communication application 30 enables a minimal communication between the terminals of area Z (it should be noted that in this case, centralized data channel 34 is unusable);

or access to applications 25 and 30 is in simultaneous mode; in this case, in isolated operation, the local communication application 30 continues to normally manage the terminals 23 attached to the site; It may also inform these terminals 23 that the centralized applications 25 (non-essential secondary services) are no longer accessible.

It should be noted that, in parallel, each terminal 23 may itself detect the loss of access to centralized applications 25. Thus, each terminal 23 may, for example, attempt to be reconnected.

In this isolated operating state, the user terminal 23 is only attached to local attachment means PDN-GW 33 by means of the local data channel 35 utilizing local access channel B. This attachment permits terminal 23 from having access to the local communication application 30 that constitutes a basic application enabling the terminal to transmit at least critical mission type data such as voice data to other terminals of the Z site. This isolated operating state is only viable since site controller 22 of a specified geographic area Z comprises:

authentication and control means MME 31 of user terminals 23 (only the terminals already attached to the network and present in the site coverage will be "known" to the authentication and control means MME 31);

a distribution gateway S-GW 32 ensuring radio reception and transmission with the base station 28;

local means PDN-GW 33 for attachment to an IP packet network;

local supervision means 50 able to detect if said infrastructure 20 is in a nominal or isolated operating state.

When infrastructure 20 is in an isolated operating state and when a non-authenticated user terminal transmits a request to the authentication and control means 31 to be attached to the site, two options are possible.

According to a first option, the site controller 22 may refuse the attachment.

According to a second option that assumes the presence of the local database 52, the authentication and control means 31 and the local data base 52 assign a temporary identifier to terminal 23.

When a temporary identifier has been assigned to terminal 23 during the isolated operating state of infrastructure 20, during the reestablishment of the nominal operation of infrastructure 20, the authentication and control means 31 force terminal 23 to authenticate itself again to said MME means 31 and static database 27.

When infrastructure 20 passes from an isolated operating state to a nominal operating state, local supervision means 50 detect and force the passage of the entire site into a nominal operating state.

In this case, the local supervision means 50 force the local communication application 30, the authentication and control means 31, the distribution gateway S-GW 32 and the local association means PDN-GW 33 to operate according to the nominal state.

It will be noted that the centralized supervision means 51 are capable of detecting the return to nominal operation. In this case, the centralized supervision means 51 inform the centralized applications 25 that they may then communicate again with the site and the terminals 23 attached to the site.

In this case, the centralized applications 25 may carry out a synchronization by, for example, updating the local applications 30.

If the infrastructure 20 operated according to an isolated state for a lengthy period, then:
- the static database 27 requests the authentication and control means 31 to re-synchronize with each of the terminals; or
- the local supervision means 50 require all terminals to be re-synchronized.

In addition, when infrastructure 20 passes from an isolated operating state to a nominal operating state and when the centralized applications 25 and the local communication application 30 are accessible in the following mode:
- alternate: centralized applications 25 take control of the local communication application 30 and inform all user terminals attached to the site controller 22 of such operation in alternate mode so as to switch the communications from local application 30 to centralized applications 25. If the operation according to an isolated state was long, it may be necessary to resynchronize a certain number of actions between the centralized application 25 and applications 25T and 30T of terminal 23, particularly with relation to changes in global network resources (PTT, list of modified group communications, etc.); In addition, during the operation of infrastructure 20 according to an isolated state, the centralized access channel A and the centralized data channel 34 may have disappeared or only the centralized data channel 34 may have disappeared. If only the centralized data channel 34 disappeared, terminal 23 will attempt to reestablish the centralized data channel 34. On the other hand, if the centralized access channel A has also disappeared, the authentication and control means 31 will first reestablish the centralized access channel A to then establish the centralized data channel 34;
- simultaneous:
  - the local communication application 30 continues to manage normally terminals 23 attached locally to the site; It may also inform these terminals 23 that the secondary services offered by the centralized applications 25 are accessible again, terminals 23 may individually be resynchronized with the services offered by the centralized applications 25 (or the centralized applications 25 may resynchronize the terminals 23).

In addition, if a terminal 23 has obtained a temporary identifier during the local operating state, means MME 31 force the terminal to be re-authenticated to the database 27 situated in centralized management means 21 in order to obtain a valid authentication on the entire network.

Contrary to the 2G technologies that propose two switched domains, that is, a circuit switched domain and another packet switched domain, infrastructure 20 according to the invention only operates in packet mode. This advantageous modality allows the flow of data that are transmitted to be increased and to manage the standard interoperable protocols and services (TCP/UDP, etc.). Thanks to this infrastructure 20 only operating in packet mode, all services are offered on IP including those that were previously offered by the circuit domain such as voice, videotelephony, SMS or else all telephony services.

Figure 3:
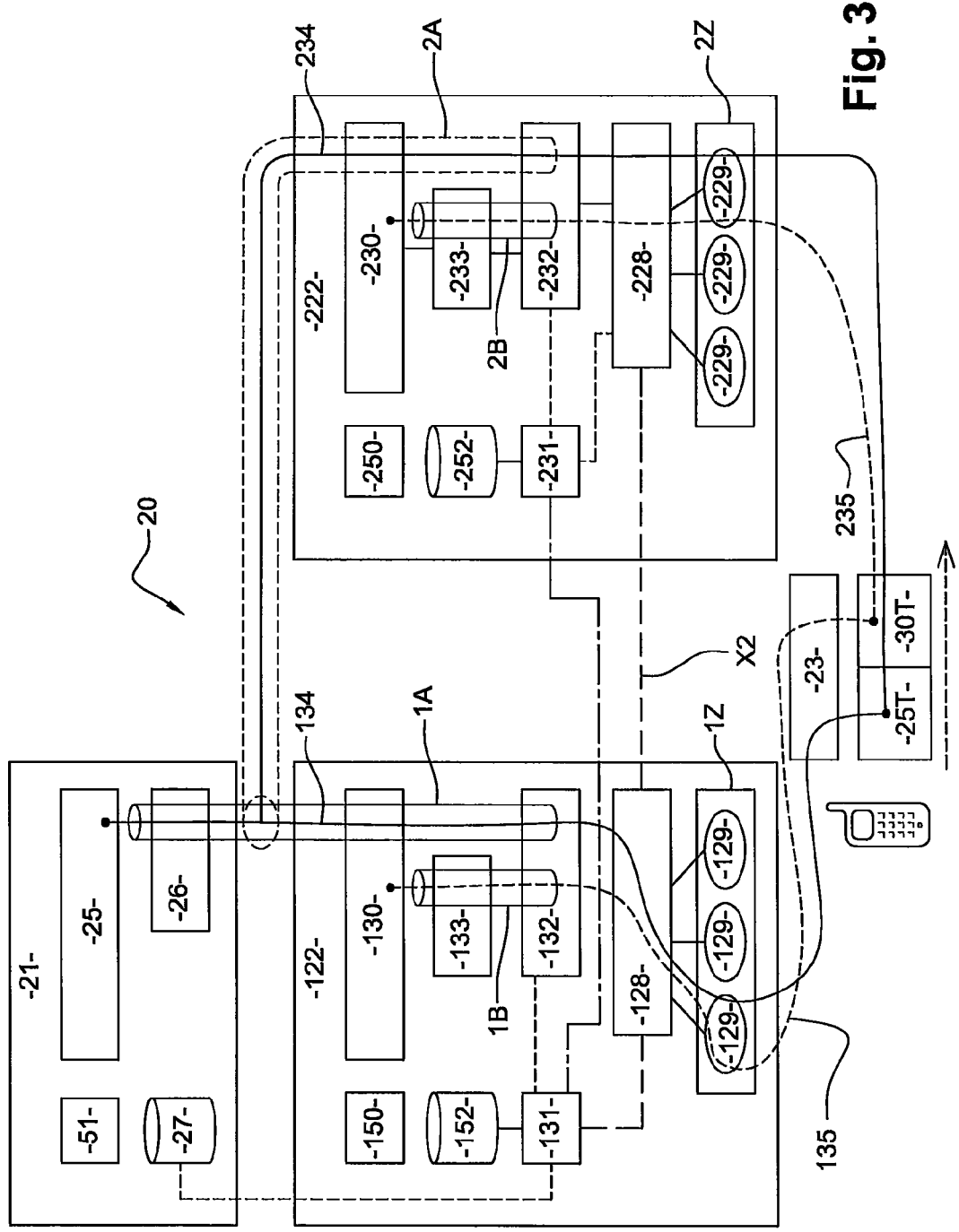
FIG. 3 illustrates a data transfer between a first specified geographic area and a second specified geographic area carried out by means of a radiocommunication infrastructure in conformance with the invention.

FIG. 3 illustrates a professional radiocommunication infrastructure 20 operating only in packet mode and identical to infrastructure 20 of FIG. 2 with the difference that two sites 1Z and 2Z are represented so as to be able to illustrate the mobility between these two sites. The same elements represented in common in each figure, that is, FIG. 2 and FIG. 3, bear identical references. On the contrary, the same elements represented in common in FIG. 2 by the reference X and in plural in FIG. 3 are designated by references 1x and 2X.

Infrastructure 20 represented in FIG. 3 comprises centralized management means 21, a first site controller 122 from a first specified geographic area or site 1Z comprising three cells 129 and a second site controller 222 from a second specified geographic area or site 2Z comprising three cells 229. The centralized management means 21 comprise:
- a plurality of centralized applications 25;
- centralized means 26 for attachment to a centralized packet network such as a PDN-GW "Packet Data Network Gateway" entity in LTE technology; and
- a database 27 comprising data related to the right of access of user terminals to a professional radiocommunication network such as an HSS "Home Subscriber Server" in LTE technology;
- centralized supervision means 151 able to reliably detect a loss of access of user terminals to site controller 122, the centralized supervision means 151 are for example formed by a system supervision entity.

The first site controller 122 serving the first area 1Z comprises:
- a first base station 128; the first base station 128 is for example an eNodeB entity in LTE technology;
- a first local application 130 of minimal communication;
- first authentication and control means 131 of user terminals; the first authentication and control means 131 are for example an MME "Mobility Management Entity" in LTE technology;
- a first distribution gateway 132; the first distribution gateway 132 is for example an S-GW "Serving Gateway" entity in LTE technology;
- first local means 133 for attachment to a first local packet network such as a PDN-GW "Packet Data Network Gateway" entity in LTE technology;
- first local supervision means 150 reliably detecting a loss of user terminal access to the centralized management means 21; the first local supervision means 150 are for example formed by a site supervision entity.

The second site controller 222 serving the second area 2Z comprises:

a second base station 228; the second base station 228 is for example an eNodeB entity in LTE technology;

a second local application 230 of minimal communication;

second authentication and control means 231 of user terminals; the second authentication and control means 231 are for example an MME "Mobility Management Entity" in LTE technology;

a second distribution gateway 232; the second distribution gateway 232 is for example an S-GW "Serving Gateway" entity in LTE technology;

second means 233 for attachment to a second local packet network such as a PDN-GW "Packet Data Network Gateway" entity in LTE technology;

second local supervision means 250 reliably detecting a loss of user terminal access to the centralized management means 21; the second local supervision means 250 are for example formed by a site supervision entity.

This FIG. 3 is represented so as to be able to illustrate a transfer of communication data when the user terminal 23 is in communication mode and a transfer of context such as the authentication data and available resources when the user terminal 23 is in idle mode.

A transfer of communication data may intervene between the site controller 122 and the site controller 222 (or vice-versa) when a user terminal 23 in communication mode passes from the first geographic area 1Z to the second geographic area 2Z (or vice-versa).

A transfer of context may intervene between the site controller 122 and the site controller 222 (or vice-versa) when a user terminal 23 in idle mode passes from the first geographic area 1Z to the second geographic area 2Z (or vice-versa).

In general, when user terminal 23 is attached to infrastructure 20 via one of cells 129 or 229, during the authentication of the terminal, the authentication and control means 131 or 231 interface with the database 27 in order to update the location of user terminal 23 and obtain the profile of user terminal 23.

In our example, when user terminal 23 is in idle mode and passes from the first specified geographic area 1Z to the second specified geographic area 2Z, the second authentication and control means 231 allocate a temporary identifier, for example of the T-IMSI (Temporary International Mobile Subscriber Identity) type, to user terminal 23 and verifies to the first authentication and control means 131 the rights of access of user terminal 23 to the professional radiocommunication network. This method is transparent for the user but not for the user terminal 23 (change of identifier).

In addition, when user terminal 23 arrives in the first area 1Z and accesses the management means 21 and site controller 122, a first centralized access channel 1A is allocated to it and a first local access channel 1B is also allocated to it by the first authentication and control means 131. In communication mode, terminal 23 may communicate via a first centralized data channel 134 passing through the centralized access channel 1A and/or a first dynamically allocated local data channel 135 passing through the first local access channel 1B. When terminal 23 passes from the first specified geographic area 1Z to the second specified geographic area 2Z, a transfer of data between the first base station 128 and the second base station 228 is carried out via an X2 or S1 intersite type transfer link in LTE technology. It should be noted that this is possible only for channels 1B and 2B. This data transfer may be carried out in conformance with the LTE technology known to the person skilled in the art.

It should be noted that according to the invention, during this passage of the first specified geographic area 1Z to the second specified geographic area 2Z, the second authentication and control means 231 allocate to the user terminal 23:

a second centralized access channel 2A passing through the second distribution gateway 232, the centralized association means 26 and the centralized application 25, it should be noted that during allocation of this second centralized access channel 2A:

if an audio type transfer is carried out, then a loss of data is produced, this data loss being non-perceptible to the user;

if a file transfer is carried out then no loss of data is produced;

a second local access channel 2B connecting the second distribution gateway 232, the second local attachment means 233 and the second local communication application 230. The allocation of the second local access channel 2B may be done with a low or high synchronization between the different applications 130 and 230. Thus, in nominal operation, terminal 23 may continue to be used, via a second centralized data channel 234 passing through the second centralized access channel 2A, the centralized applications 25.

In addition, user terminal 23 may utilize, via a second local data channel 235 passing through the second local access channel 2B, the second local communication application 230.

When the transfer of data between the first site controller 122 and the second site controller 222 is finalized, all the context connected to the communication is transferred to site controller 222.

By way of example, thanks to this method, when a video onboard a vehicle (not represented) transmits, in streaming mode, high definition videos to the centralized application 25 and when the vehicle passes from the first coverage area 1Z to the second coverage area 2Z, it is possible to carry out a transfer of data between the first base station 128 and the second base station 228 so as to not interrupt the transmission to the centralized application 25.

Generally, one may note that at the nominal state the centralized packet network and the local packet network may be physically the same or interconnected. A cutting is carried out when it passes into an isolated state.

In other words, the invention confers a significant mobility for PMR type networks by taking advantage of the mobility offered by the LTE or WIMAX type networks. In fact, user terminals may utilize the mobile radiocommunication standard implanted and accessible in many geographic areas without necessarily requiring a substantial hardware infrastructure.

Compared to current professional radiocommunication infrastructures, this professional radiocommunication infrastructure ensures basic communication in the site during local operation of the infrastructure. In addition, this infrastructure proposes high level speeds, a good QoS quality of service level for its subscribers and ensures flux continuity in mobility.

The invention claimed is:

1. A professional radiocommunication network infrastructure operating in packet mode, said infrastructure comprising:

a site controller with a specified geographic area comprising at least one base station capable of ensuring radio transmission and reception with at least one user terminal found in at least one cell attached to said base station;

centralized management means comprising:

at least one centralized application configured to communicate with a first application in said terminal;

centralized supervision means configured to detect if said infrastructure is in a nominal or isolated operating state; and centralized means for associating with a centralized packet network to establish access between said at least one centralized application and said first application during operation of said infrastructure detected according to a nominal state;

said site controller comprising:

at least one local communication application configured to communicate with a second application in said user terminal;

local supervision means configured to detect if said infrastructure is in a nominal or isolated operating state;

user terminal authentication and control means configured to authenticate the user terminals belonging to said professional network;

a distribution gateway configured to ensure radio reception and transmission with said at least one base station; and local means for attachment to a local packet network to establish access between said local communication application and said second application during operation of said infrastructure detected according to an isolated state, wherein when said infrastructure is found in a nominal operating state, the following is allocated to each user terminal situated in the specified geographic area and attached to said site controller:

a centralized access channel connecting said distribution gateway to said centralized application via first attachment means, said user terminal being able to be attached to said first attachment means via said distribution gateway by means of a centralized data channel that is dynamically allocated to it, said centralized data channel passing through said centralized access channel;

a local access channel connecting said distribution gateway to said local communication application via second attachment means, said user terminal being able to be attached to said second attachment means via said distribution gateway by means of a local data channel that is dynamically allocated to it, said local data channel passing through said local access channel; and when said infrastructure is in an isolated operating state in the course of which access to said centralized management means is interrupted, only said local access channel is allocated to each user terminal situated in the specified geographic area and attached to said site controller, said user terminal being able to be attached to said second attachment means via said distribution gateway by means of said local data channel that is dynamically allocated to it and passing through said local access channel.

2. The professional radiocommunication network infrastructure according to claim 1, wherein said centralized management means comprise a database comprising data related to the right of access of user terminals to said professional radiocommunication network.

3. The professional radiocommunication network infrastructure according to claim 2, wherein the infrastructure is in conformance with a mobile radiocommunication standard LTE, said centralized association means being formed by a PDN-GW "Packet Data Network Gateway" entity,
said database being formed by an HSS "Home Subscriber Server" entity,
said centralized supervision means being formed by a system supervision entity, said local association attachment means being formed by a second PDN-GW "Packet Data Network Gateway" entity,
said authentication and control means of said user terminals being carried out by an MME "Mobility Management Entity,"
said distribution gateway being formed by an S-GW "Serving Gateway" entity,
said local supervision means being formed by a site supervision entity,
said at least one base station being formed by an eNodeB "evolved NodeB" entity.

4. The professional radiocommunication network according to claim 1, wherein, in said nominal state, each communicating user terminal situated in the specified geographic area and attached to said site controller is simultaneously connected to said centralized application via said centralized data channel and to said local communication application via said local data channel such that said user terminal only retains said local data channel when said infrastructure switches over in its isolated state.

5. The professional radiocommunication network according to claim 1, wherein, in said nominal state, each communicating user terminal situated in the specified geographic area and attached to said site controller is only connected to said centralized application via said centralized data channel, said local data channel being effective when said infrastructure switches over in its isolated state.

6. The professional radiocommunication network infrastructure according to claim 1, wherein the infrastructure is in conformance with a high capacity or high speed mobile radiocommunication standard in any IP mode of the LTE or WIMAX type.

7. The professional radiocommunication network infrastructure according to claim 1, wherein said user terminal authentication and control means are configured to select a distribution gateway and the centralized means for attachment to a centralized packet network that will be used to implement said centralized data channel passing through said centralized access channel.

8. The professional radiocommunication network infrastructure according to claim 1, wherein said user terminal authentication and control means are configured to select a distribution gateway and the local means for attachment to a local packet network that will be used to implement said local data channel passing through said local access channel.

9. The professional radiocommunication network infrastructure according to claim 1, wherein the infrastructure comprises at least two site controllers each configured to manage a specified geographic area, said at least two site controllers being configured to communicate with each other and each of said site controllers being configured to communicate with said centralized management means.

10. The professional radiocommunication network infrastructure according to claim 1, wherein at least one of said packet networks is an IP network.

11. The professional radiocommunication network infrastructure according to claim 1, wherein said authentication and control means comprise means for dynamically allocating said centralized data channel and said local data channel.

12. A method for user terminal access to at least one local communication application and at least one centralized application within a professional radiocommunication network infrastructure, said infrastructure comprising:

centralized management means comprising:
at least one centralized application configured to communicate with a first application in said terminal, centralized supervision means configured to detect if said infrastructure is in a nominal or isolated operating state, and centralized means for attachment to a centralized packet network to establish access between said at least one centralized application and said first application during operation of said infrastructure detected according to a nominal state;

a database comprising data relative to the right of access of user terminals to said professional radiocommunication network, a site controller for a specified geographic area comprising:

at least one base station configured to ensure radio transmission and reception with user terminals found in at least one cell attached to said base station;

at least one local communication application configured to communicate with a second application in said user terminal;

user terminal authentication and control means configured to authenticate the user terminals belonging to said professional network;

a distribution gateway ensuring radio reception and transmission with said at least one base station; and local means for attachment to a local packet network;

wherein, when said infrastructure is found in a nominal operating state, said method comprises:

authenticating said user terminal via said authentication and control means upon arrival of said user terminal in said cell, verifying the rights of access of said user terminal to said professional radiocommunication network via said authentication and control means communicating with said database, allocating a centralized access channel connecting said distribution gateway to said centralized application via said first centralized attachment means; the allocation of said centralized access channel allowing a centralized data channel passing through said centralized access channel performing the attachment of said user terminal to said centralized association means via said distribution gateway to be dynamically allocated to said user terminal, allocating a local access channel connecting said distribution gateway to said local communication application via second local attachment means; the allocation of said local access channel allowing a local data channel passing through said local access channel performing the attachment of said user terminal to local attachment means via said distribution gateway to be dynamically allocated to said user terminal, said centralized and local access channels being accessible in a first operating state of the infrastructure called the nominal state and only said local access channel being accessible in a second operating state of the infrastructure called the isolated state such that said user terminal is able to be attached to only to local association means via said distribution gateway by means of said local data channel when access to said centralized management means is interrupted.

13. The method according to claim 12, comprising detecting by local supervision means belonging to said site controller a loss of access of the user terminals to said centralized management means, said local supervision means forcing the passage from the nominal state to the isolated state in said site controller.

14. The method according to claim 13, comprising detecting by said local supervision means a recovery of access of user terminals to said centralized management means, said local supervision means forcing the passage from the isolated state to the nominal state in said site controller.

\* \* \* \* \*